United States Patent
Vasseur et al.

(10) Patent No.: US 9,923,911 B2
(45) Date of Patent: Mar. 20, 2018

(54) ANOMALY DETECTION SUPPORTING NEW APPLICATION DEPLOYMENTS

(71) Applicant: Cisco Technology, Inc., San Jose, CA (US)

(72) Inventors: Jean-Philippe Vasseur, Anchorage, AK (US); Sukrit Dasgupta, Norwood, MA (US); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/878,171

(22) Filed: Oct. 8, 2015

(65) Prior Publication Data

US 2017/0104775 A1   Apr. 13, 2017

(51) Int. Cl.
*G06F 11/00* (2006.01)
*H04L 29/06* (2006.01)
*H04L 29/08* (2006.01)
*G06F 9/445* (2018.01)

(52) U.S. Cl.
CPC ............ *H04L 63/1425* (2013.01); *G06F 8/60* (2013.01); *H04L 67/34* (2013.01)

(58) Field of Classification Search
CPC ...... H04L 63/1425; H04L 63/102; G06F 8/60
See application file for complete search history.

(56) References Cited

U.S. PATENT DOCUMENTS

| | | | |
|---|---|---|---|
| 6,177,885 B1 | 1/2001 | Weil et al. | |
| 7,954,090 B1 * | 5/2011 | Qureshi | G06N 5/048 714/25 |
| 8,332,337 B2 | 12/2012 | Harrison et al. | |
| 8,601,322 B2 * | 12/2013 | Stolfo | G06F 11/3652 714/38.1 |
| 8,683,591 B2 | 3/2014 | Wittenschlaeger | |
| 9,268,938 B1 * | 2/2016 | Aguayo Gonzalez | G01R 21/00 |
| 9,450,979 B2 * | 9/2016 | Keromytis | G06F 11/08 |
| 2007/0118638 A1 * | 5/2007 | Ban | G05B 23/0272 709/224 |
| 2007/0239329 A1 * | 10/2007 | Fujinaga | G07C 5/008 701/31.4 |
| 2007/0294756 A1 * | 12/2007 | Fetik | G06F 21/552 726/11 |
| 2008/0022404 A1 | 1/2008 | Holtmanns et al. | |

(Continued)

OTHER PUBLICATIONS

Thubert, et al., "An Architecture for IPv6 Over the TSCH Mode of IEEE 802.15.4e", Internet Draft, draft-ietf-6tisch-architecture-05, Jan. 27, 2015, 40 pages, Internet Engineering Task Force Trust.

*Primary Examiner* — Techane Gergiso
(74) *Attorney, Agent, or Firm* — Parker Ibrahim & Berg LLC; James M. Behmke; Stephen D. LeBarron

(57) ABSTRACT

In one embodiment, a device in a network maintains information regarding anomaly detection models used in the network and applications associated with traffic analyzed by the anomaly detection models. The device receives an indication of a planned application deployment in the network. The device adjusts an anomaly detection strategy of a particular anomaly detector in the network based on the planned application deployment and on the information regarding anomaly detection models used in the network and the applications associated with the traffic analyzed by the anomaly detection models.

20 Claims, 9 Drawing Sheets

(56) References Cited

U.S. PATENT DOCUMENTS

| | | | |
|---|---|---|---|
| 2008/0305869 A1* | 12/2008 | Konforty | A63F 13/12 463/29 |
| 2009/0100492 A1* | 4/2009 | Hicks, III | H04L 12/2825 725/127 |
| 2009/0144823 A1* | 6/2009 | Lamastra | H04L 12/585 726/22 |
| 2009/0313699 A1* | 12/2009 | Jang | G06F 21/52 726/23 |
| 2011/0087899 A1* | 4/2011 | Fetik | G06F 21/552 713/193 |
| 2012/0042255 A1* | 2/2012 | Vaidya | H04L 41/508 715/736 |
| 2012/0240185 A1* | 9/2012 | Kapoor | H04L 63/1425 726/1 |
| 2014/0137246 A1* | 5/2014 | Baluda | G06F 21/552 726/22 |
| 2014/0289418 A1* | 9/2014 | Cohen | G06F 11/3688 709/226 |
| 2015/0039749 A1* | 2/2015 | Kwan | H04L 41/5067 709/224 |
| 2015/0193696 A1 | 7/2015 | Vasseur et al. | |
| 2015/0341246 A1* | 11/2015 | Boubez | H04L 43/0876 709/224 |

* cited by examiner

ANOMALY DETECTION SUPPORTING NEW APPLICATION DEPLOYMENTS

TECHNICAL FIELD

The present disclosure relates generally to computer networks, and, more particularly, to anomaly detection supporting new application deployments in a network.

BACKGROUND

Anomaly detection may be used to detect a number of conditions in a computer network. For example, anomaly detection may be used to identify misbehaving devices, misconfigured devices, behavioral changes, potential network attacks, or other such network conditions. One form of attack that may be detected using anomaly detection techniques is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed.

A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
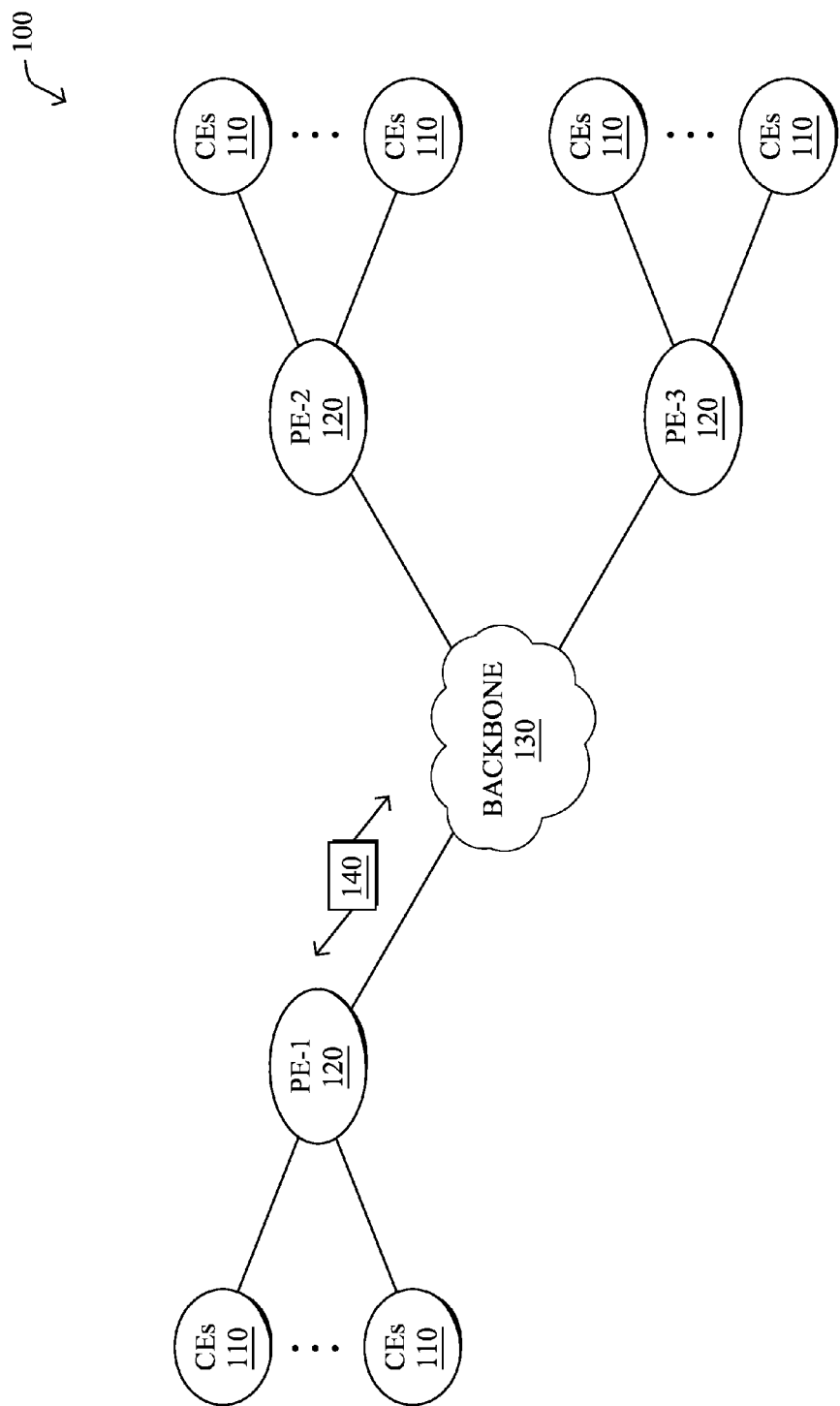
FIGS. 1A-1B illustrate an example communication network.

According to one or more embodiments of the disclosure, a device in a network maintains information regarding anomaly detection models used in the network and applications associated with traffic analyzed by the anomaly detection models. The device receives an indication of a planned application deployment in the network. The device adjusts an anomaly detection strategy of a particular anomaly detector in the network based on the planned application deployment and on the information regarding anomaly detection models used in the network and the applications associated with the traffic analyzed by the anomaly detection models.

In further embodiments, an anomaly detector in a network provides information regarding one or more anomaly detection models executed by the device and the applications associated with the traffic analyzed by the one or more anomaly detection models. The anomaly detector receives an indication of a new application to be deployed in the network. The anomaly detector adjusts an anomaly detection strategy of the anomaly detector based on the received indication of the new application to be deployed in the network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
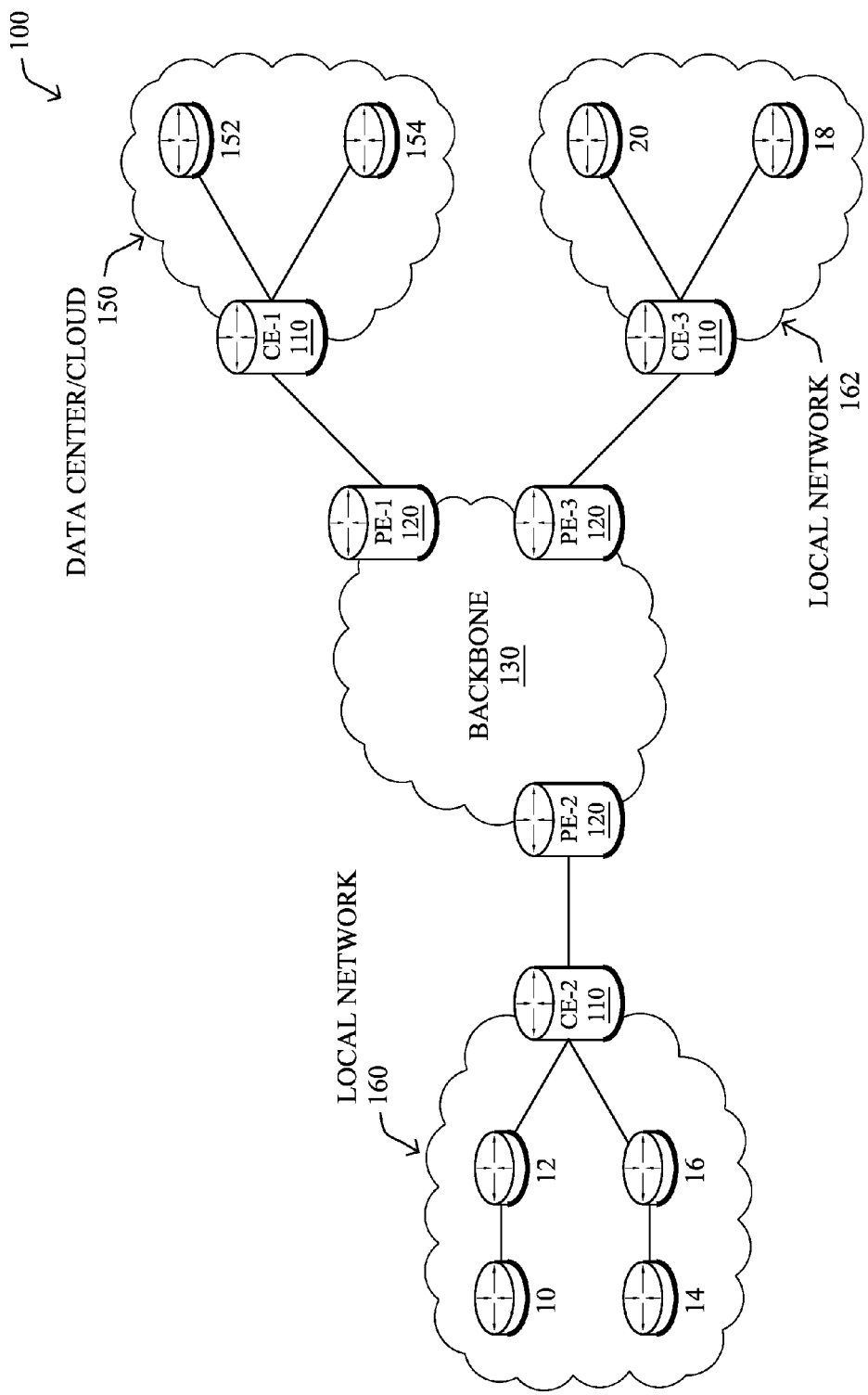

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, devices, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical devices), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
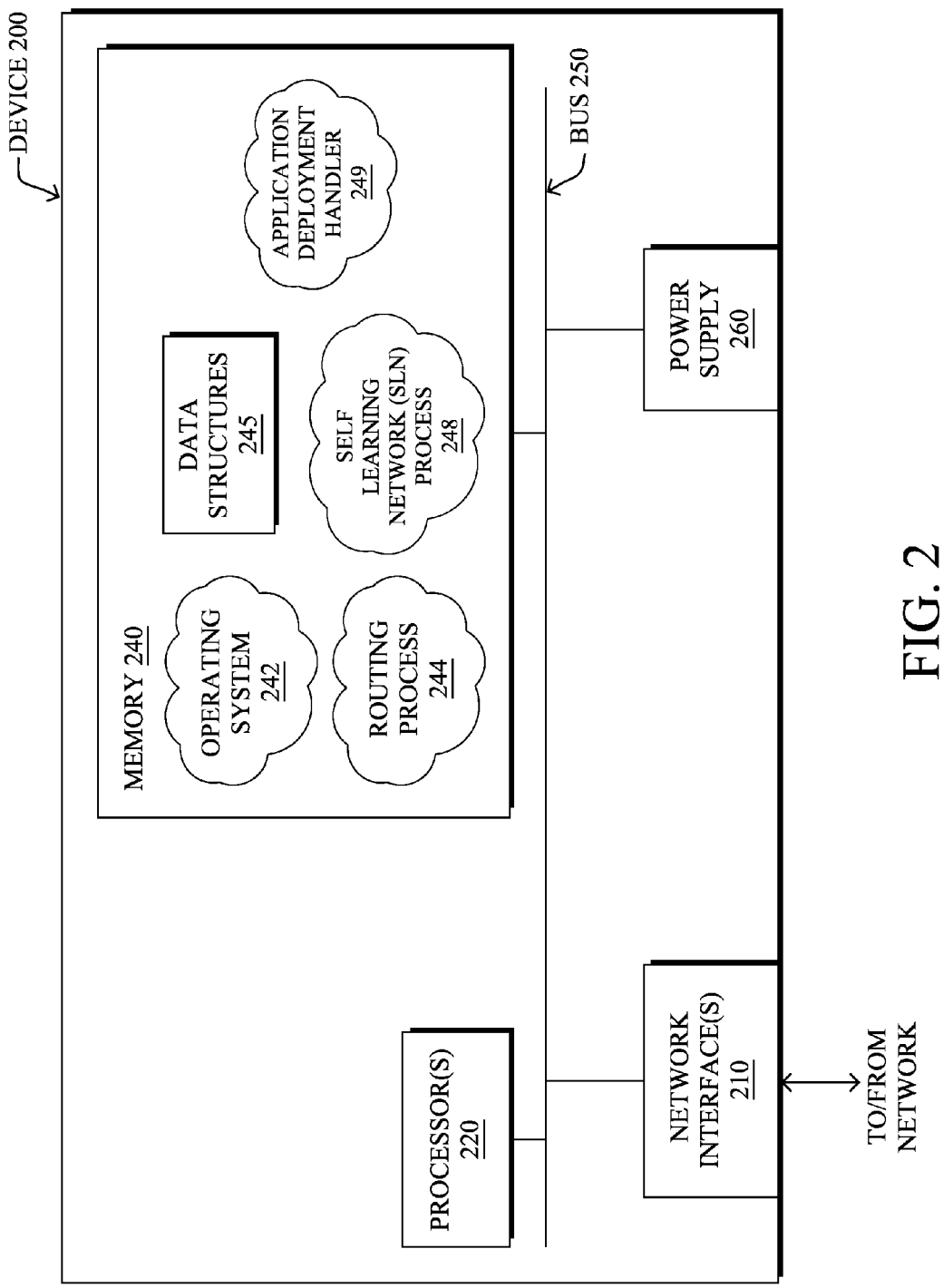
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, and/or an application deployment handler process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be configured to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Such anomalies may be detected using advanced machine learning algorithms(s) capable of modeling subtle changes or correlation between changes (e.g., unexpected behavior) in a highly dimensional space. Such anomalies are raised in order to detect the presence of a 0-day malware; such a malware may be used in order to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

Malware may be detected because of their impact on traffic, host models, graph-based analysis, etc., when attempting to connect to C2 channel, move laterally, or ex-filtrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, a SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured ACL, route redistribution policy, routing policy, QoS policy maps, or the like, may have dramatic consequences such a traffic blackhole, QoS degradation, etc. Such misconfiguration may be advantageously identified by SLN process 248, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

Figure 3:
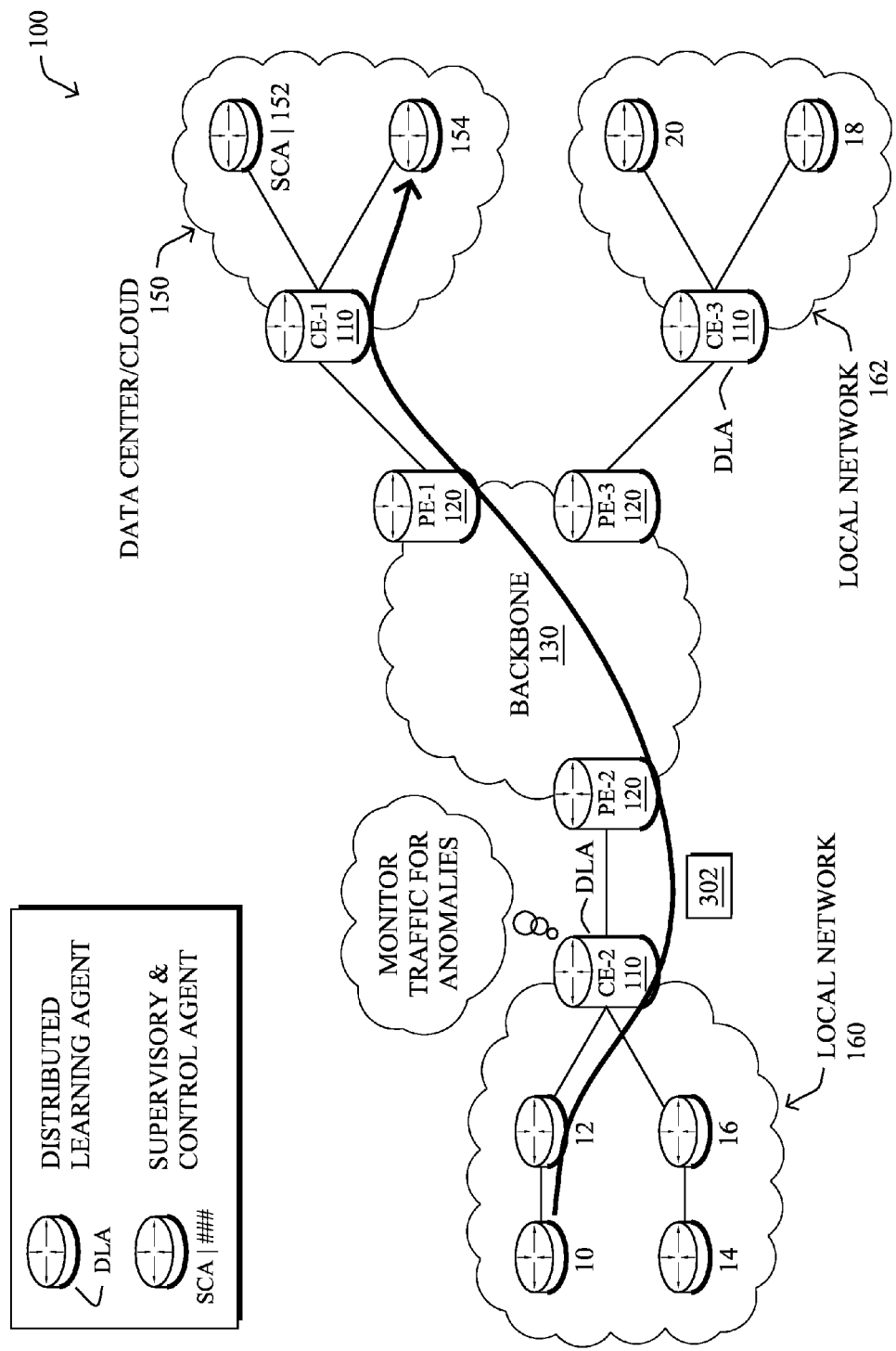
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be configured to monitor network conditions (e.g., router states, traffic flows, etc.), perform anomaly detection on the monitored data using one or more machine learning models, report detected anomalies to the SCA, and/or perform local mitigation actions. Similarly, an SCA may be configured to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

Anomalies such as DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, Internet Behavioral Analytics (IBA) may be used as part of the anomaly detection mechanisms in network 100. In general, IBA refers to the use of advanced analytics coupled with networking technologies, to detect anomalies in the network. Although described later with greater details, the ability to model the behavior of a device (networking switch/router, host, etc.) will allow for detection of the presence of a malware, which is complementary to the use of Firewall making use of static signatures. Observing behavioral changes (deviation from modeled behavior) thanks to (aggregated) flows records, deep packet inspection, etc., may allow detection of an anomaly such as an horizontal movement (e.g. propagation of a malware, etc.), or an attempt to perform information exfiltration.

As noted above, any number of DLAs may be deployed in a network to detect anomalous changes in the behavior of the network. However, certain behavioral changes in a network may be attributable to perfectly legitimate causes. One such cause is the deployment of new applications in the network, which could significantly change the traffic patterns in the network. Notably, a newly deployed application may 1.) greatly impact the traffic profiles of hosts in the network, 2.) generate new traffic flows that were not present in the network prior to deployment of the application, and/or 3.) in the context of cloud-based applications, result in drastic traffic pattern changes upon a change in service provide, datacenter, or a (transparent) rollout of a new version (e.g., continuous integration).

Thus, deployment of a new application in a network may cause anomaly detectors that perform traffic modeling (e.g., host-based, graph-based, etc.) to treat the resulting traffic changes as network anomalies. Consequently, the anomaly detectors may raise false anomaly detection alerts during and after the deployment of the application. Additionally, the false detections and alerts may conceal true anomalies in the network during this time.

Anomaly Detection Supporting New Application Deployments

The techniques herein allow a DLA to adjust its anomaly detection strategy when a known/planned application deployment is likely to raise false anomalies. In some aspects, the SCA may keep track of the anomaly detection models and features used by the DLAs in the network. In response to receiving an indication of a planned application deployment, the SCA may determine whether any of the models were computed in a site where the new application has already been deployed. If so, the SCA may proactively push the model to the DLAs that have not been exposed yet to the application. In response to receiving an indication of the deployment of a new application, a DLA may enter into an observation mode (e.g., not raising any false alarms knowing that its current model is not yet up to date), and/or into a fast learning mode whereby the DLA computes a new anomaly detection model, with the option of using the two models in parallel, should an anomaly take place concurrently with the deployment of the new application.

Specifically, according to one or more embodiments of the disclosure as described in detail below, a device in a network maintains information regarding anomaly detection models used in the network and applications associated with traffic analyzed by the anomaly detection models. The device receives an indication of a planned application deployment in the network. The device adjusts an anomaly detection strategy of a particular anomaly detector in the network based on the planned application deployment and on the information regarding anomaly detection models used in the network and the applications associated with the traffic analyzed by the anomaly detection models.

Illustratively, the techniques described herein may be performed by hardware, software, and/or firmware, such as in accordance with processes 244, 248, and 249, which may contain computer executable instructions executed by the processor 220 (or independent processor of interfaces 210) to perform functions relating to the techniques described herein. For example, the techniques herein may be treated as extensions to conventional protocols, such as the various wired or wireless communication protocols, and as such, may be processed by similar components understood in the art that execute those protocols, accordingly.

Operationally, a first aspect of the techniques herein relates to an SCA tracking application usage in the network. Notably, an SCA may be configured to orchestrate updates to the DLAs, receive information regarding anomalies detected by the DLAs, and perform other supervisory functions. In various embodiments, the SCA may also be configured to maintain a database of the anomaly detection models (e.g., host-based, graph-based, etc.) used by the various DLAs in the network and a description of the applications observed by the DLAs to compute these models.

Figure 4A:
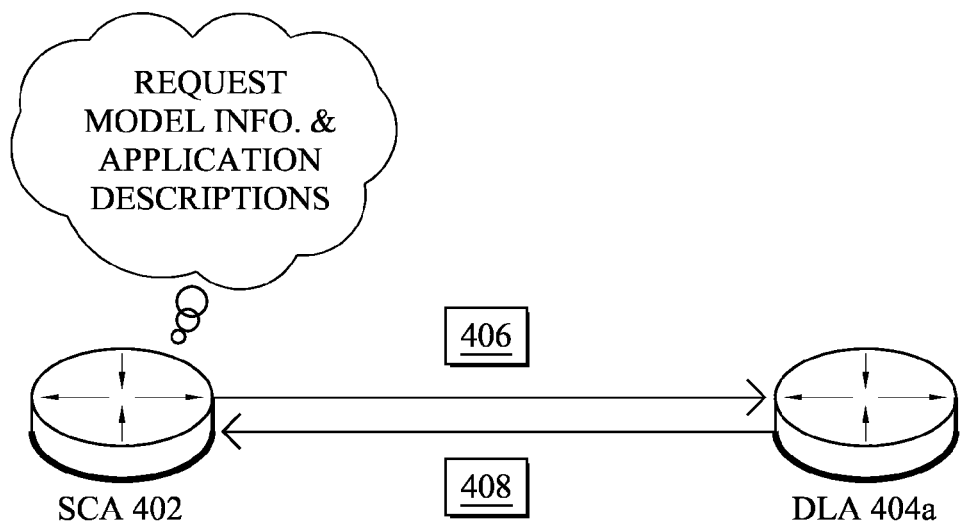
FIGS. 4A-4D illustrate examples of a supervisory device tracking anomaly detection models and associated applications in a network.

Referring now to FIGS. 4A-4D, examples are shown of an SCA tracking anomaly detection models and associated applications in a network, according to various embodiments. As shown in FIG. 4A, an SCA 402 may receive a message 408 comprising information regarding the anomaly detection model(s) used by any number of DLAs in the network to detect anomalies (e.g., a first DLA 404a, a second DLA, etc.) and the applications associated with the models.

In some embodiments, SCA 402 may send a request message 406 to the DLA(s) as a unicast message or multicast message, to retrieve the computed anomaly detection models from the DLA(s) and their associated applications. For example, request message 406 may be a custom DLA-MODELS(attributes) message that requests information regarding the anomaly detection models and/or the series of inputs used to build the models. In machine learning parlance, these inputs are often referred to as input features. This may comprise not only the set of input features, but also their ranges of values, etc. In addition, request message 406 may request information regarding the applications associated with the traffic analyzed by DLA 404a when calculating its anomaly detection model(s). In response, DLA 404a may provide the requested information back to SCA 402 via message 408. In further embodiments, DLA 404a may provide the model information to SCA 402 on a push basis (e.g., without first receiving an explicit request for the information from SCA 402).

Figure 4B:

As shown in FIG. 4B, SCA 402 may generate and maintain a model database for the models used by the DLAs in the network based on the model information received via messages 408 from the DLAs. For example, an entry in the model database may identify a particular anomaly detection model used by DLA 404a, the input features of the model, the applications associated with the traffic analyzed by DLA 404a to construct the particular model, the site/location of DLA 404a in the network, or any other information regarding the anomaly detection model used by DLA 404a (e.g., the type of model, etc.). In some cases, the model database may further include information regarding any application deployments that occurred in the network (e.g., where an application was deployed in the network, when the application was deployed, etc.).

Figure 4C:
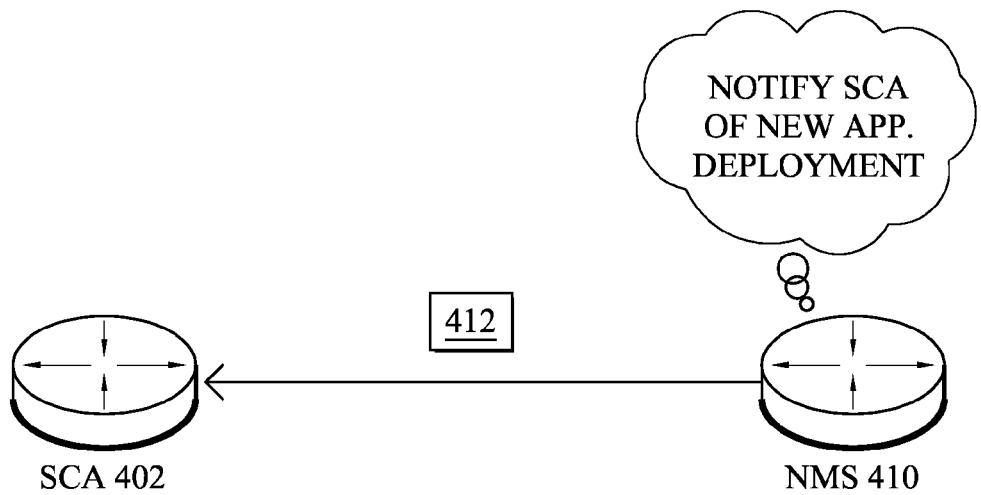

Another aspect of the techniques herein relates to the SCA being notified of a planned application deployment. For example, as shown in FIG. 4C, SCA 402 may receive a message 412 from another supervisory device, such as NMS 410, that indicates that a new application is to be deployed in the network. For example, message 412 may be a custom message called NEW-APP(attributes) that includes various attributes regarding the application to be deployed. For example, message 412 may indicate an application ID for the application, expected traffic changes for the various hosts in the network, the schedule for the deployment (e.g., listing a list of sites and the expected date/time for the new application to be deployed), new ports and destinations to be used by the application, or any other information regarding the application to be deployed in the network.

In some embodiments, message 412 may further include an anomaly detection model for the application to be deployed. For example, the model may be a multi-dimensional statistical model having dimensions such as the number of bytes expected for the new traffic, the number of packets expected for the new traffic, expected seasonalities, categorical features (e.g., the transport protocol used by the application, etc.), the degree of burstiness of the traffic, or the like.

Figure 4D:

In response to receiving an indication of a new application to be deployed in the network, the SCA may inspect its model database, to determine whether or not the application has already been deployed elsewhere in the network (e.g., at other sites, etc.). For example, as shown in FIG. 4D, SCA 402 may determine whether the application indicated by message 412 has already been deployed in the network or is otherwise already in use. In one embodiment, the SCA may do so by determining whether the SCA previously received a NEW-APP(attributes) message that has the same or similar attributes as the newly received message (e.g., the same order of magnitude in terms of traffic pattern changes, etc.). For example, SCA 402 may log NEW-APP(attributes) messages in the model database and consult the database whenever a new message is received concerning a planned application deployment.

Figure 5A:
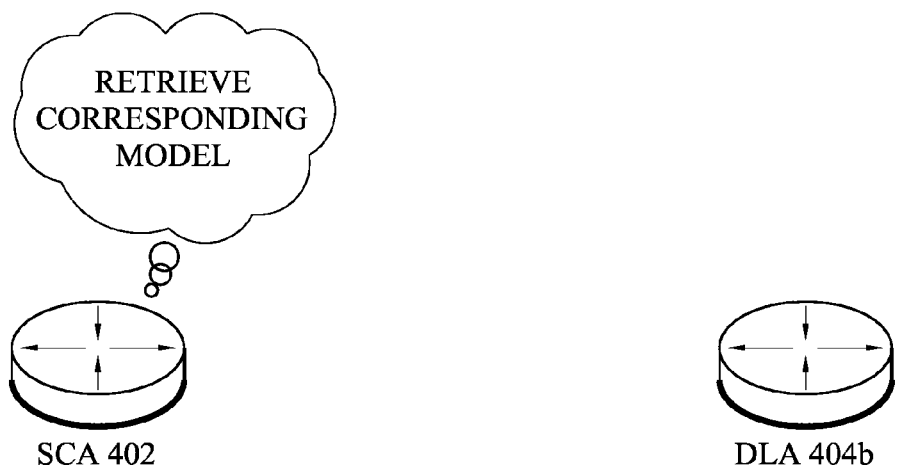
FIGS. 5A-5C illustrate examples of a supervisory device sending an anomaly detection model to an anomaly detector for an application to be deployed.
Figure 5B:
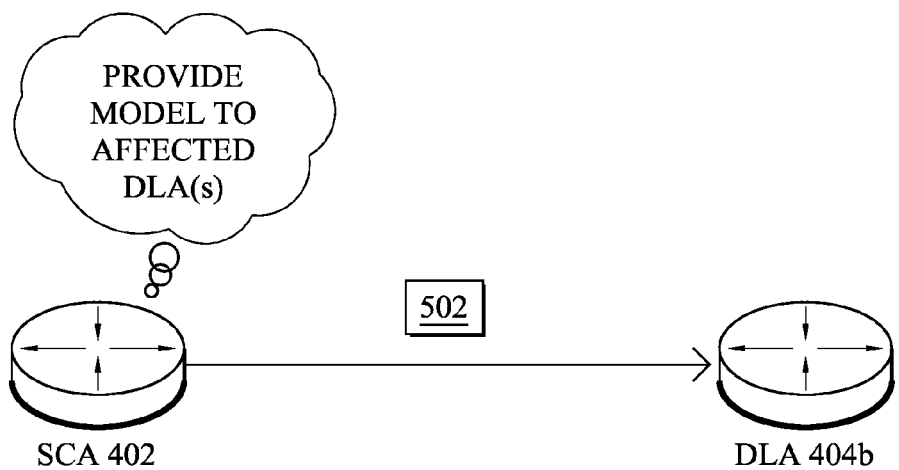
Figure 5C:

Referring now to FIGS. 5A-5C, examples are shown of an SCA sending an anomaly detection model to an anomaly detector for an application to be deployed, according to various embodiments. Based on determination described above, the SCA may instruct the DLA(s) affected by the planned application deployment to adjust their anomaly detection strategies in a number of different ways.

If the SCA determines that the same application planned for deployment was previously deployed in the network, or if a similar application was deployed, it may retrieve the corresponding anomaly detection models from its model database. For example, as shown in FIG. 5A, assume that SCA 402 receives an indication from NMS 410 that application XYZ is to be deployed in a portion of the network. In turn, SCA 402 may determine whether application XYZ or a similar application has already been deployed elsewhere in the network and, if so, retrieve the anomaly detection model(s) used by the DLAs in the previous area of deployment. In other words, the SCA may retrieve one or more anomaly detection models from the model database that are already configured to analyze traffic from the application to be deployed (e.g., based on analyses performed by other DLAs that are already affected by the application).

As shown in FIG. 5B, SCA 402 may provide the retrieved anomaly detection model(s) to any number DLAs that will be affected by the deployment of the application via a message 502. For example, assume that DLA 404a is located at a site in which the application was already deployed and that a particular anomaly detection model used by DLA 404a is configured to analyze traffic associated with the application. Also, assume that the application is now going to be deployed at a second site at which anomaly detector/DLA 404b is located. In such a case, SCA 402 may provide the model used by DLA 404a to DLA 404b via message 502.

Message 502 may be a custom DLA-UPDATE message that may be sent as a unicast or multicast message to the DLA(s) located in the portion of the network to which the application is to be deployed. Notably, the NEW-APP(attributes) message received by SCA 402 (e.g., from the NMS, etc.) may indicate where the application will be deployed.

In some embodiments, DLA 404b may begin using the anomaly detection model(s) received from SCA 402 in response to receiving message 502 or at a time specified in message 502. In another embodiment, DLA 404b may integrate the received model(s) into its existing anomaly detection models, as shown in FIG. 5C. For example, DLA 404b may merge its current model and the received model(s) into its current environment in terms of features, ranges of values taken by the features, etc. In turn, DLA 404b may enter into a fast learning mode whereby DLA 404b may increase its learning rate temporarily, to adjust the new model to the new application and only raise anomalies after convergence. In another embodiment, DLA 404b may also keep using its previous model(s) applied to the previous set of features without the new application (which may not be possible, depending on the model being used), while learning a new model, should a real anomaly arise while in the fast learning mode.

Figure 6A:
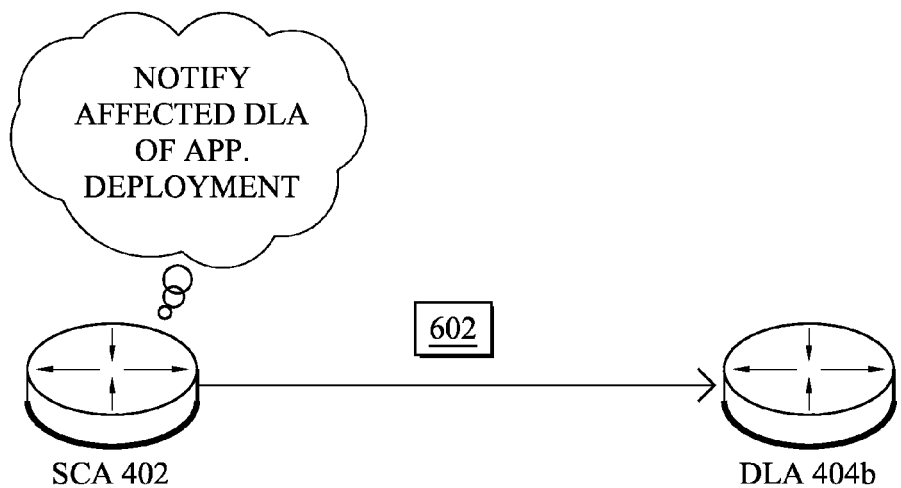
FIGS. 6A-6C illustrate examples of the operation of an anomaly detector during deployment of an application in the network.
Figure 6B:
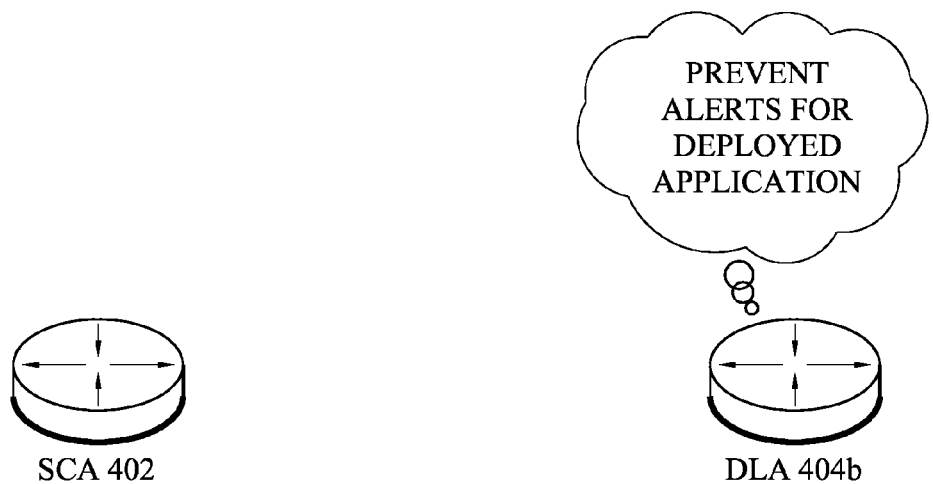
Figure 6C:
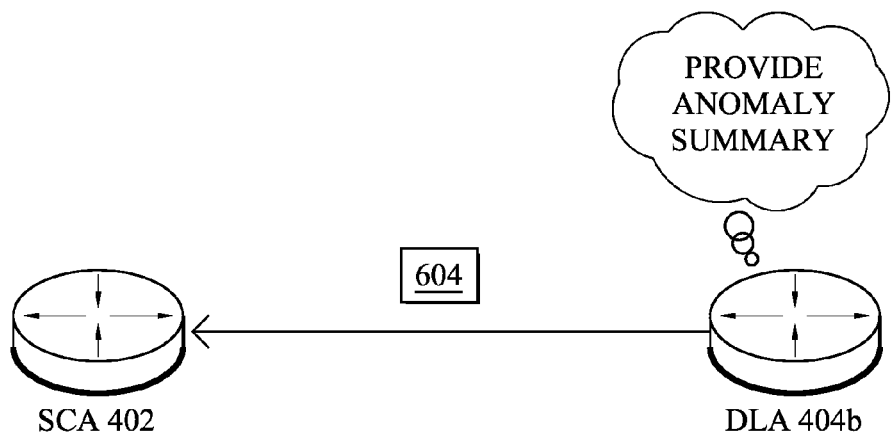

Referring now to FIGS. 6A-6C, examples are shown of the operation of an anomaly detector during deployment of an application in the network, according to various embodiments. In some cases, none of the models in the model database may be configured to analyze traffic for the application to be deployed. In these cases, the SCA may instruct the affected DLAs to adjust their anomaly detection strategies to accommodate deployment of the new application.

As shown in FIG. 6A, assume that SCA 402 determines that none of the anomaly detection models in the model database are configured to analyze traffic for the application to be deployed. In such cases, SCA 402 may send a message 602 to DLA 404b and any other DLAs affected by the deployment, to indicate that the application is going to be deployed in the area of the network serviced by DLA 404b. For example, SCA 402 may forward the NEW-APP(attributes) message received from NMS 410 to DLA 404b, if SCA 402 determines that there are no suitable anomaly detection models in the model database. Such a message may be augmented with further instructions related to the action DLA 404b should take during deployment of the application. In other embodiments, message 602 may simply be informative.

In various embodiments, message 602 may request that DLA 404b stop performing anomaly detection using its current models and/or to update its models using a more disruptive approach (e.g., by increasing the learning rate of DLA 404b). For example, if SCA 402 determines that the model(s) used by DLA 404b may be greatly affected by the deployment of the new application and that many false positives are expected, message 602 may request that DLA 404b enter into the fast learning mode, to quickly adapt its local models to the new traffic associated with the application.

In addition to, or in lieu of, DLA 404b adapting its local anomaly detection models to learn the new traffic patterns of the application, message 602 may instruct DLA 404b to prevent DLA 404b from raising or sending anomaly detection alerts during or after deployment of the application. For example, as shown in FIG. 6B, DLA 404b may enter into an observation mode in which DLA 404b adjusts its local anomaly detection strategy, to stop raising alerts (e.g., knowing that the newly deployed application is a normal event that was not present during the learning phase of its local anomaly detection model). Note that such a mechanism helps the system not to trigger false alarms during deployment of the new and expected application.

In another embodiment, it is possible that the new application is not behaving as per the intended or expected behavior. This is possible due to bugs, unintended network side effects, unexpected user interactions, or the like. In this situation, the NEW-APP(attributes) message sent to the DLA may fail to capture this behavior and, in turn, these deviations may appear anomalous even if the DLA has been sent an anomaly detection model specifically configured to analyze the application traffic. As shown in FIG. 6C, DLA 404b may continue to track anomalies during and after deployment of the application and generate a summary of the detected anomalies. For example, because DLA 404b knows that a new application has been deployed, it may provide a summary of any detected anomalies to SCA 402 (e.g., via message 604), instead of flooding SCA 404 with anomaly detection alerts.

In response to receiving a summary of anomaly detection alerts generated during or after deployment of a new application, SCA 402 may generate a new set of characteristics for the application to be shared with other DLAs that were sent the NEW-APP(attributes) message. In response, the other DLAs may purge their own summaries of deviations to free up state, knowing that the deviations are being tracked across the network via the SCA.

Figure 7:
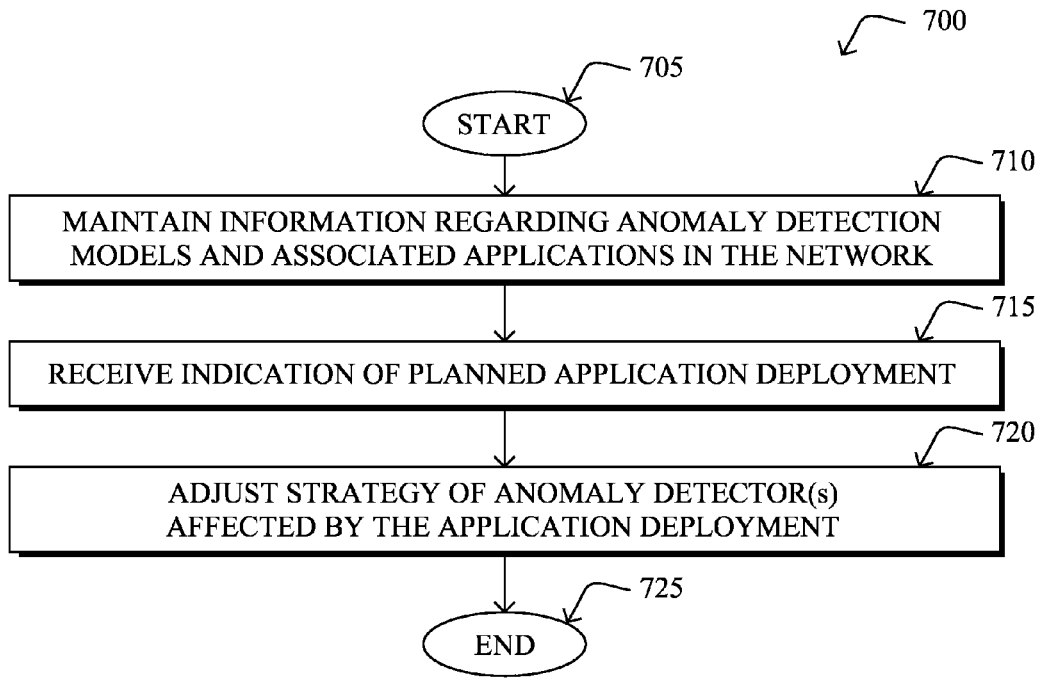
FIG. 7 illustrates an example simplified procedure for adjusting an anomaly detection strategy of an anomaly detector based on a planned application deployment.

Referring now to FIG. 7, an example simplified procedure is shown for adjusting an anomaly detection strategy of an anomaly detector based on a planned application deployment, in accordance with one or more embodiments described herein. The procedure 700 may begin at step 705 and continue on to step 710 where, as described in greater detail above, a device in a network (e.g., an SCA, etc.) may maintain information regarding anomaly detection models used in the network and their associated applications. For example, the device may receive information from the various anomaly detectors/DLAs in the network regarding their local anomaly detection models and, in turn, maintain a database of the models. In addition, the database may also include information regarding which applications are associated with the anomaly detection models. For example, assume that traffic from application XYZ was analyzed to calculate a particular anomaly detection model. In such a case, the device may store this information for later use, in case the application or a similar application is to be deployed in another area of the network.

At step 715, the device may receive an indication of a planned application deployment, as described in greater detail above. For example, the indication may include an application identifier (ID), data regarding expected traffic changes in the network attributable to the application deployment (e.g., in terms of ports used, burstiness, transmitted bytes or packets, etc.), a deployment schedule, where in the network the application is to be deployed, combinations thereof, or the like.

At step 720, as detailed above, the device may adjust an anomaly detection strategy of one or more anomaly detectors that will be affected by the deployment of the application. In some embodiments, the device may determine whether the application or a similar application was previously deployed somewhere in the network and, if so, whether any of the detection models in the model database were trained based on traffic from the application. If so, in one embodiment, the device may adjust the anomaly detection strategy of an affected anomaly detector by providing the corresponding model(s) to the detector. In turn, the detector may begin using the model and/or integrate the received model into its existing anomaly detection models. In another embodiment, the device may instruct the anomaly detector to enter into a fast learning mode, thereby allowing the detector to quickly learn the behavioral changes attributable to the new application. In further embodiments, the device may adjust the strategy of the anomaly detector by instructing the detector to prevent the sending of anomaly detection alerts (e.g., so that the detector does not flood the network with false alerts due to the new application). In some cases, the detector may instead provide simply a summary of the alerts raised due to the new application. Procedure 700 then ends at step 725.

Figure 8:
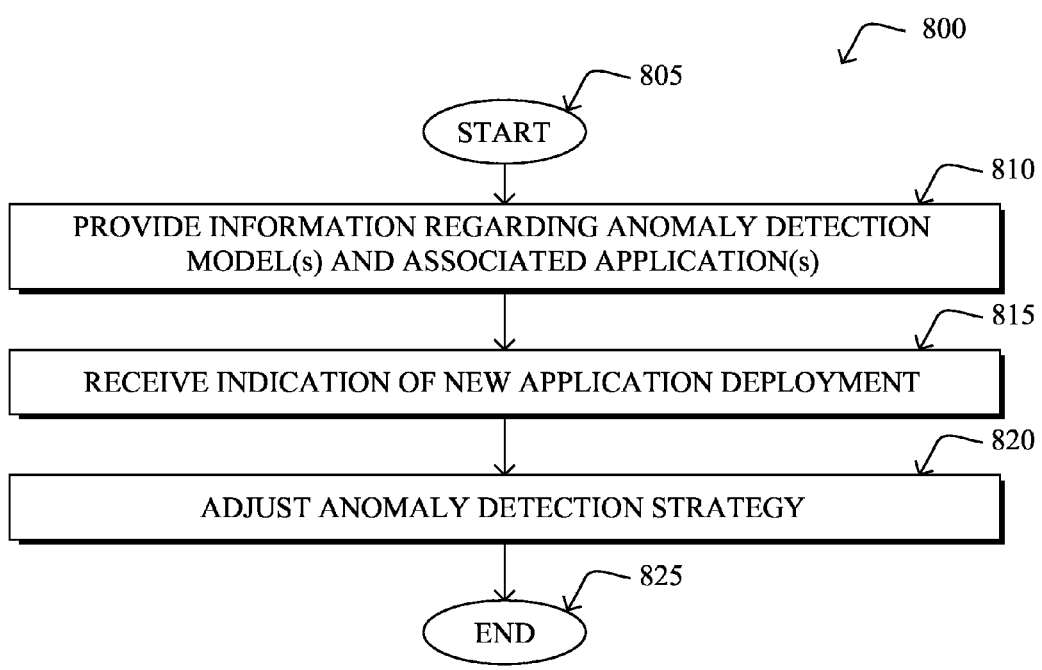
FIG. 8 illustrates an example simplified procedure for adjusting a local anomaly detection strategy of an anomaly detector for an application deployment.

FIG. 8 illustrates an example simplified procedure for adjusting a local anomaly detection strategy of an anomaly detector for an application deployment, in accordance with one or more embodiments described herein. The procedure 800 may begin at step 805 and continue on to step 810 where, as described in greater detail above, a device in a network configured as an anomaly detector may provide information regarding its anomaly detection model(s) to one or more other devices (e.g., to an SCA). In particular, for any given anomaly detection model used by the detector, the detector may provide information regarding the type of model, the input features of the model, the model itself, or the like. Further, the detector may provide information regarding the applications associated with the model (e.g., the applications associated with the traffic used to train the model).

At step 815, as detailed above, the anomaly detector may receive an indication of a new application deployment. In one embodiment, the indication may comprise a new anomaly detection model that was previously trained using traffic for the application or for a similar application. In other embodiments, the indication may comprise instructions to enter into one of various operating modes.

At step 820, the anomaly detector may adjusts its anomaly detection strategy based on the received indication of the planned application deployment, as described in greater detail above. In one embodiment, if the indication includes an anomaly detection model, the detector may integrate the received model into its own local models already in use. In another embodiment, the anomaly detector may enter into a fast learning mode, to train its local model(s) using the traffic of the new application. In a further embodiment, the anomaly detector may prevent anomaly detection alerts raised during or after deployment of the application from being sent. For example, the detector may suppress all anomaly detection alert message or may provide only a summary of the raised alerts. Procedure 800 then ends at step 825.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, dramatically improves situations in which deployment of a new application in the network is likely to trigger false anomaly detection alerts (a very common situation), by making the SLN devices aware of the deployment. In turn, the SLN devices may adapt faster to the new environment and avoid a storm of false alerts, which could hide a real attack. Notably, the central position of an SCA may be leveraged to collect the computed anomaly detection models used in the network and, if any of the models were previously built using traffic from the application, integrate these models into the anomaly detectors that will be affected by the application deployment.

While there have been shown and described illustrative embodiments that provide for dynamic enabling of routing devices in a network, it is to be understood that various other adaptations and modifications may be made within the spirit and scope of the embodiments herein. For example, while the techniques herein are described primarily with respect to behavioral changes in a network due to the deployment of an application, the techniques herein may also be adapted to adjust the anomaly detection mechanisms of the network for any other situation that may affect the behavior of the network (e.g., deployment of a new rule, protocol, policy, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
maintaining, by a device in a network, information regarding anomaly detection models used in the network and applications associated with traffic analyzed by the anomaly detection models wherein the device acts as a supervisory and control agent (SCA) device;
receiving, at the device, an indication of a planned application deployment in the network; and
adjusting, by the device, an anomaly detection strategy of a particular anomaly detector of a distributed learning agent (DLA) device in the network prior to deployment of the planned application, wherein the information regarding anomaly detection models used in the network and the applications associated with the traffic analyzed by the anomaly detection models is used by the device to adjust the anomaly detection strategy.

2. The method as in claim 1, further comprising:
receiving, at the device and from one or more anomaly detectors of one or more DLA devices in the network, the information regarding the anomaly detection models and the applications associated with the traffic analyzed by the anomaly detection models.

3. The method as in claim 1, wherein the indication of the planned application deployment in the network comprises at least one of: an application identifier, data regarding expected traffic changes in the network attributable to the application deployment, or a deployment schedule.

4. The method as in claim 1, wherein adjusting the anomaly detection strategy of the particular anomaly detector comprises:
determining, by the device, that the planned application deployment relates to one of the applications associated with the traffic analyzed by a particular anomaly detection model of the anomaly detection models; and
providing, by the device, the particular anomaly detection model to the particular anomaly detector.

5. The method as in claim 1, wherein adjusting the anomaly detection strategy of the particular anomaly detector comprises:
determining, by the device, that the planned application deployment does not relate to one of the applications associated with the traffic analyzed by the anomaly detection models; and
instructing, by the device, the particular anomaly detector to prevent anomaly detection alerts from being sent during the application deployment.

6. The method as in claim 5, further comprising:
receiving, from the DLA device, a summary of alerts raised by the particular anomaly detector during the application deployment.

7. A method, comprising:
providing, by an anomaly detector of a distributed learning agent (DLA) device in a network, information regarding one or more anomaly detection models executed by the DLA device and the applications associated with the traffic analyzed by the one or more anomaly detection models;
receiving, at the DLA device from a supervisory and control agent (SCA) device, an indication of a new application to be deployed in the network and an adjusted anomaly detection model, wherein the adjusted anomaly detection model is adjusted by the SCA device based on other anomaly detection models used in the network and applications associated with traffic analyzed by the other anomaly detection models; and
prior to deployment of the planned application, adjusting, by the DLA device, an anomaly detection strategy of the anomaly detector based on the adjusted anomaly detection model.

8. The method as in claim 7, wherein the indication of the new application to be deployed in the network comprises a particular anomaly detection model that analyzes traffic associated with the new application to be deployed.

9. The method as in claim 8, further comprising:
merging the one or more anomaly detection models executed by the DLA device with the particular anomaly detection model that analyzes traffic associated with the new application to be deployed, to form a merged anomaly detection model.

10. The method as in claim 9, further comprising:
increasing a training rate for the merged anomaly detection model.

11. The method as in claim 7, further comprising:
preventing, by the DLA device, anomaly detection alerts from being sent during deployment of the new application.

12. The method as in claim 11, further comprising:
summarizing, by the DLA device, anomaly detection alerts generated during deployment of the new application.

13. An apparatus, comprising:
one or more network interfaces to communicate with a network;
a processor coupled to the network interfaces and adapted to execute one or more processes to act as a supervisory and control agent (SCA) device for a plurality of distributed learning agent (DLA) devices in the network; and
a memory configured to store a process executable by the processor, the process when executed configured to:
maintain information regarding anomaly detection models used in the network and applications associated with the traffic analyzed by the anomaly detection models;
receive an indication of a planned application deployment in the network; and
adjust an anomaly detection strategy of a particular anomaly detector at a DLA device of the plurality of DLA devices in the network prior to deployment of the planned application, wherein the information regarding anomaly detection models used in the network and the applications associated with the traffic analyzed by the anomaly detection models is used by the DLA device to adjust the anomaly detection strategy.

14. The apparatus as in claim 13, wherein the apparatus adjusts the anomaly detection strategy of the particular anomaly detector by:
determining that the planned application deployment relates to one of the applications associated with the traffic analyzed by a particular anomaly detection model of the anomaly detection models; and
providing the particular anomaly detection model to the particular anomaly detector.

15. The apparatus as in claim 13, wherein the apparatus adjusts the anomaly detection strategy of the particular anomaly detector by:
determining that the planned application deployment does not relate to one of the applications associated with the traffic analyzed by the anomaly detection models; and
instructing the particular anomaly detector to prevent anomaly detection alerts from being sent during the application deployment.

16. The apparatus as in claim 13, wherein the indication of the planned application deployment in the network comprises at least one of: an application identifier, data regarding expected traffic changes in the network attributable to the application deployment, or a deployment schedule.

17. An apparatus, comprising:
one or more network interfaces to communicate with a network;
a processor coupled to the network interfaces and adapted to execute one or more processes to act as a distributed learning agent (DLA) device in the network; and
a memory configured to store a process executable by the processor, the process when executed configured to:
provide, to a supervisory and control agent (SCA) device, information regarding one or more anomaly detection models executed by the apparatus and applications associated with the traffic analyzed by one or more anomaly detection models of the apparatus;
receive, from the SCA device, an indication of a new application to be deployed in the network and an adjusted anomaly detection model, wherein the adjusted anomaly detection model is adjusted by the SCA device based on other anomaly detection models used in the network and applications associated with traffic analyzed by the other anomaly detection models; and
prior to deployment of the planned application, adjust an anomaly detection strategy of the anomaly detector based on the adjusted anomaly detection model.

18. The apparatus as in claim 17, wherein the indication of the new application to be deployed in the network comprises a particular anomaly detection model that analyzes traffic associated with the new application to be deployed, and wherein the process when executed is further configured to:
  merge the one or more anomaly detection models executed by the apparatus with the particular anomaly detection model that analyzes traffic associated with the new application to be deployed, to form a merged anomaly detection model.

19. The apparatus as in claim 17, wherein the process when executed is further configured to:
  prevent anomaly detection alerts from being sent during deployment of the new application.

20. The apparatus as in claim 17, wherein the process when executed is further configured to:
  summarize anomaly detection alerts generated during deployment of the new application.

* * * * *